United States Patent [19]

Darling

[11] 4,097,439

[45] Jun. 27, 1978

[54] POLYURETHANE COATING COMPOSITION CURABLE BY ADDITION POLYMERIZATION

[75] Inventor: Thomas Robert Darling, Wilmington, Del.

[73] Assignee: E. I. Du Pont de Nemours and Company, Wilmington, Del.

[21] Appl. No.: 766,598

[22] Filed: Feb. 8, 1977

[51] Int. Cl.$^2$ .............................................. C08L 18/04
[52] U.S. Cl. ............................ 260/31.2 N; 260/31.6; 260/75 NP; 260/75 NQ; 260/77.5 CR; 260/77.5 AM; 260/77.5 MA
[58] Field of Search ................. 260/77.5 CR, 75 NP, 260/75 NQ, 77.5 AM, 77.5 MA, 31.2 N, 31.6

[56] References Cited

U.S. PATENT DOCUMENTS

| | | | |
|---|---|---|---|
| 3,437,514 | 4/1969 | Burlant | 427/44 |
| 3,509,234 | 4/1970 | Burlant et al. | 260/77.5 CR |
| 3,641,199 | 2/1972 | Niederhauser et al. | 260/77.5 CR |
| 3,878,036 | 4/1975 | Chang | 260/77.5 CR |
| 3,891,523 | 6/1975 | Hisamatsu et al. | 260/31.8 M |

*Primary Examiner*—M. J. Welsh

[57] ABSTRACT

Coating composition containing at least one free radical polymerizable ethylenically unsaturated monomer, and a chain extended polyurethane polymer having terminally ethylenically unsaturated groups and preferably polymeric urea linkages, said polymer having a molecular weight of between about 2,000 and 20,000. The polymerizable monomer is at least a partial solvent for the polymer. The coating compositions may be cured by free radical reactions to yield tough, mar-resistant coatings.

4 Claims, No Drawings

POLYURETHANE COATING COMPOSITION CURABLE BY ADDITION POLYMERIZATION

This invention relates to a coating composition that may be cured by subjecting it to light or other free radical polymerization methods. The coating composition has the property of ease of application, prompt cure, and the cured coating is tough, elastomeric, mar-resistant, stain-resistant, readily adherent to most common substrates such as wood, metal, vinyl and other floor tile and the like.

Photocurable polyurethane coatings are known in the art — for example, see U.S. Pat. Nos. 2,948,611 to Barney and 3,891,523 to Hisamatsu et al. This latter patent describes a coating composition containing a polymer formed by the reaction of a polyisocyanate and a polyhydroxy compound and an unsaturated addition-polymerizable compound having a hydroxyl group, and optionally an addition-polymerizable monomer such as methyl methacrylate which can act as a solvent for the polymer, and a photosensitizer. This patent requires that the polymer contains free isocyanate groups. Another class of photocurable polyurethane coatings is prepared by reacting an excess of diisocyanate with a polymeric polyol and further reacting the residual isocyanate groups with an active hydrogen-containing ethylenically unsaturated compound. In use, the resulting polymer is normally diluted with a photocurable monomer. Coatings of this type are disclosed in U.S. Pat. No. 3,437,514 to Burlant.

The present invention differs from that disclosed in U.S. Pat. No. 3,891,523 in that the polymer used in this invention is produced from a reaction mixture containing an amount of isocyanate groups equal to the number of hydroxyl groups, or a reaction mixture in which the isocyanate groups equal the number of hydroxyl groups plus the number of amine groups. The polymer of the present invention is produced by first reacting an excess of at least one diisocyanate with at least one diol or diamine, and at least one ethylenically unsaturated alcohol or monoamine having an active hydrogen. After this reaction is complete that reaction product is subjected to a chain extension reaction by reacting the remaining isocyanate groups with water, a primary or secondary diamine, a diol or an aminoalcohol. Thus the polymer does not contain unreacted isocyanate groups. It differs from coating compositions of the type taught in U.S. Pat. No. 3,437,514 in that it is chain extended. The chain extended polymer provides a coating having the excellent elastic characteristics previously mentioned. This is in contrast to the relatively brittle, short-breaking coatings provided by the prior art compositions. Preferably, at least a portion of the chain extension reaction is carried out by means of amine groups or water, for when amine groups or water are employed in the chain extension reaction, the resulting polymer contains urea linkages which on the ultimate coated article results in a coating having tougher, more elastomeric, "rubbery" properties. Preferred polymers contain 2 to 6 urea linkages.

The coating composition also contains an ethylenically unsaturated monomer capable of being polymerized by said catalyst. This monomer must be at least a partial solvent for the hereinafter more fully defined polymer. This monomer should have a molecular weight of about 80 to 500. Suitable monomers include mono-ethylenically unsaturated compounds such as methyl methacrylate, methyl acrylate, ethyl methacrylate, styrene, N-vinyl-2-pyrrolidone, ethyl hexyl acrylate, vinyl acetate, acrylic acid, methacrylic acid, acrylonitrile, and similar related compounds. These monomers will react upon suitable activation and form polymeric chains with themselves and with the hereinafter defined polymer. On occasion, it may be desirable to replace a portion of the mono-ethylenically unsaturated monomers listed above with monomers containing two or more ethylene linkages. Representative materials include ethylene glycol dimethacrylate, 1,6-hexanediol dimethacrylate, glycerine triacrylate and trimethylol propane trimethacrylate. An especially preferred class of compounds containing two ethylenic linkages are adducts prepared by reacting a diisocyanate with 2 moles of a hydroxyalkyl acrylate or similar compound. Any of the diisocyanates described hereinafter can be used, but adducts derived from 4,4'-methylenebis(cyclohexyl isocyanate) are preferred with the preferred hydroxy-compound being 2-hydroxyethyl acrylate. The addition of some monomer containing 2 or more ethylenic linkages increases the crosslinking in the cured coatings and results in changes in the properties of the coating such as lower elongation and tear strength which are compensated for by improved stain resistance and solvent resistance. The preferred adduct of 2-hydroxyethyl acrylate and 4,4'-methylenebis(cyclohexyl isocyanate) has been found to increase stain and solvent resistance at lower concentrations than do other monomers containing multiple ethylenic linkages with the result that other physical properties are changed to a lesser extent.

The amount of these monomers in the final coating composition can be varied to bring the viscosity of the coating composition into the necessary operative range, i.e., about 1.0 to 3,000 poises. Normally one or more of these monomers are present in the coating composition in the amount of about 5 to 70% by weight of the coating composition. Non-polymerizable volatile solvents may also be present in the coating composition.

The coating composition can additionally contain about 0.01 to 10 percent by weight of a light activatable free radical producing catalyst or other free radical producing catalyst. Such catalysts are well known in the art and include such compounds as benzoin and its derivatives, alpha,alpha-azobisisobutyronitrile, cumene hydroperoxide, organic sulfides and the like. When activation is effected by means such as electron beam, no catalyst is required.

The polymer employed in the coating compositions of this invention has a molecular weight of 2,000 to 20,000, preferably 4,000 to 12,000, and has the formula

In the above formula G is a bivalent organic radical resulting from the removal of terminal hydrogen groups from a diol, a primary or secondary diamine or an aminoalcohol having a molecular weight of about 300 to about 3,000. Suitable diols that may be used to form the G radical include poly(ethylene adipate) diol, poly(butylene isophthalate) diol, polytetramethylene ether glycol, polycaprolactone diol, polypropylene glycol, polyethylene glycol, partially esterified polyols, polyesterethers and the like. Polyalkylene ether glycols prepared by random or block copolymerization of cyclic ethers such as ethylene oxide, propylene oxide and tetrahydrofuran are also useful. Hydroxy-terminated polybutadiene and hydroxy-terminated hydrogenated polybutadiene can also be used. Representative diamines include poly(propylene ether) diamine, N,N'-dicyanoethyl poly(propylene ether) diamine and the di-4-aminobenzoate of polytetramethylene ether glycol. Minor amounts of the diol or diamine can be replaced by chemically equivalent amounts of trifunctional or higher functionality polyols or polyamines if it is desired to increase the cross-link density of the composition.

In the above formula B is a bivalent organic radical having a molecular weight of about 80 to 400. B is the "nucleus" of an organic diisocyanate with the NCO groups removed. B is provided by diisocyanates of the following type: aliphatic isocyanates such as dicyclohexyl methane diisocyanate, 2,2,4-trimethyl-1,6-hexamethylene diisocyanate; 1-isocyanato-3-isocyanatomethyl-3,5,5-trimethyl cyclohexane; hexahydrotoluene diisocyanate; aromatic diisocyanates such as tolylene diisocyanate, meta-xylene-diisocyanate; paraxylene-diisocyanate; 4-chloro-1,3-phenylene diisocyanate; 4,4'-biphenylene diisocyanate; 1,5-tetrahydronaphthalene diisocyanate. For non-discoloring compositions, aliphatic diisocyanates are preferred.

In the above formula, Q is a carbonyl radical

or a diacyl radical having the formula

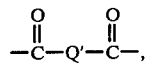

where: Q' is a bivalent organic radical formed by removal of two active hydrogens from a primary or secondary diamine, a diol or an aminoalcohol and is selected from G and radicals having molecular weights between 60 and 300. Compositions in which Q' is a carbonyl radical are formed by chain extending with water. Suitable compounds that may be employed to form the Q' radical include: hexamethylene diamine, 4,4'-methylenebis(cyclohexyl amine), 1-amino-3-aminomethyl-3,5,5-trimethylcyclohexane, ethylene diamine, piperazine, ethylene glycol, 1,4-butandiol, 1,3-butandiol, ethanolamine, 1-amino-3-butanol, aromatic diamines such as meta phenylenediamine and 2,4-tolylenediamine. Preferably, Q' has a molecular weight between 60 and 300, because polymers containing such Q' radicals give final coatings having the degree of toughness usually desired on most coated substrates. On occasion, higher molecular weight diamines and diols (having molecular weights up to about 2,000) of the types described hereinbefore as being useful for forming G radicals can be used to provide Q'. A preferred class of diamine chain extending agents are the reaction products which can be formed from aliphatic diprimary amines, such as ethylene diamine and hexamethylene diamine, and highly reactive monomers such as methyl or 2-ethyl-hexyl acrylate. These adducts readily form at room temperature upon contacting about equal molar portions of a diamine and an acrylate monomer. The use of these adducts simplifies the preparation of the polymer by reducing the reactivity of the unaltered diamine and yields products which are more readily soluble in the reactive monomer diluents.

In the above formula, X is a monovalent organic radical formed by removal of an active hydrogen from an ethylenically unsaturated monoalcohol or a monoamine, and having a molecular weight of less than 300. Suitable compounds include alcohols or primary or secondary amines containing a single active hydrogen and at least one polymerizable ethylenic linkage. A preferred class of these materials are the mono-acrylate and mono-methacrylate esters of diols representative of which are 2-hydroxyethyl acrylate, 2-hydroxyethyl methacrylate, 2-hydroxypropyl acrylate, 2-hydroxypropyl methacrylate, diethylene glycol monoacrylate and 4-hydroxybutyl methacrylate. Closely related are diol esters of other unsaturated acids such as crotonic acid, tiglic acid and undecylenic acid. Esters containing residues of diols and half-esters of unsaturated dicarboxylic acids are also useful. Representative of these are 2-hydroxylethyl ethyl fumarate, 2-hydroxypropyl methyl itaconate and 2-hydroxyethyl ethyl maleate.

Another useful class of compounds are unsaturated alcohols such as allyl alcohol, methallyl alcohol, methyl vinyl carbinol, β-allyloxyethanol and p-allylbenzyl alcohol. Closely related are unsaturated phenols such as o-, m- or p-hydroxystyrene and o- or p-allyl phenol.

Representative amines suitable for providing X include allyl amine, methallyl amine and N-methyl allyl amine. Reaction products of equal molar amounts of unsaturated monoisocyanates and diamines (which may be aliphatic or aromatic) are also useful amines. Representative of these are reaction products of allyl isocyanate and ethylene diamine or hexamethylene diamine. Obviously the unsaturated isocyanates can also be reacted with equimolar amounts of diols or aminoalcohols to provide corresponding unsaturated monohydroxy compounds.

On occasion it may be desirable to replace a portion of the preceding compounds, all of which contain one active hydrogen and a single ethylenic linkage, with an active hydrogen compound containing two or more ethylenic linkages. The use of compounds with higher functionality serves to introduce additional cross-links into the final photocured products of this invention. The most convenient compounds for this purpose are partially esterified triols, tetrols or polyols having higher hydroxyl functionality employing acrylic or methacrylic acids. Representative compounds include trimethylolpropane diacrylate, glycerine dimethacrylate, pentaerythritol triacrylate and pentaerythritol trimethacrylate.

In the above formula for the polymer, n is the integer 1, 2, 3 or 4.

The polymer is suitably prepared in a series of reactions; first, the diisocyanate and the monoalcohol or monoamine having ethylenic unsaturation are reacted; then the high molecular weight diol is added to form a polyurethane. In the preferred case where the chain extension is to be conducted with a highly direactive chain extension compound, this polyurethane is formed from proportions of reactants so that a portion of the isocyanate groups is unreacted, thus forming a urethane polymer with a portion of the ends of the polymer chains capped with ethylenically unsaturated groups. Finally, the chain extension compound is reacted with the remaining isocyanate groups. Preferably, the chain extension reaction is carried out in the presence of the ethylenically unsaturated monomer that is at least a partial solvent for the polymer. While the order of addition of the various reactants can be varied as will be recognized by those skilled in the art, the above procedure is preferred.

The polymer is present in the coating composition to the extent of about 30 to 90% by weight of the coating composition.

Other ingredients may be added to the coating composition, such as pigments, fillers, other reactive monomers, and the photosensitive catalyst or other free radical producing catalyst in the amount of about 0.01 to 10% by weight of the solution may also be added at this time if required.

The composition may then be spread on a suitable substrate and subjected to the action of light, electron beam or heat to activate the system. A suitable light source should include light having a wave length of 1,800 to 7,000 A.

In the following examples all parts and percentages are by weight unless otherwise specified.

EXAMPLES

EXAMPLE 1

A resin kettle was charged with 26.6 g of 4,4'-dicyclohexyl methane diisocyanate (20% trans,transisomer, 65% cis-trans-isomer and 15% cis,cis-isomer) and 0.013 g dibutyl tin dilaurate. At 70° C, 100 g of molten poly(ethylene adipate) diol, hydroxyl number 56.4, was added in small portions over a period of one hour. The reaction was continued until a constant isocyanate level of 3.13% was attained for the isocyanate capped polyester. A solution of ½ the isocyanate equivalence, or 5.38 g of 2-hydroxyethyl acrylate and 0.26 g di-o-tert.-butyl-p-cresol (antioxidant) was added to the reaction mixture and reacted at 30° C. The mixture was diluted with 27 g of ethyl methacrylate.

The remaining ½ equivalent of isocyanate was reacted with an equivalent of 2.71 g of molten 1,6-hexamethylene diamine which was added first to 20 g of methylacrylate and then added in a dropwise manner to the reaction mixture at 30° C. When the diamine chain extension was complete, 1.5 g benzoin methyl ether in 1 ml dimethylformamide, 1 g 2-hydroxyethyl acrylate, and 5.7 g methacrylic acid were added to complete the polymer syrup preparation. An 0.020 inch thick layer of syrup was doctored between two 0.001 inch films of poly(ethylene terephthalate). This was irradiated with a 1 watt/inch "Rayonet" 3500 Å lamp (Southern N. E. Ultraviolet Co., Middletown, Conn.) to effect a complete photopolymerization. The polyester cover sheets were removed and the resulting tough, colorless elastomeric film exhibited the following physical properties: tensile strength, 4350 psi; 100% molulus, 900 psi; 200% modulus, 1900 psi; 300% modulus, 4200 psi; elongation at break, 310%; fast tear ASTM D-412, 43 pli.

EXAMPLE 2

In a manner similar to that described in Example 1 an isocyanate capped polyester (3.39 percent isocyanate) was prepared from 106.4 g of 4,4'-dicyclohexyl methane diisocyanate and 400 g of poly(ethylene adipate) diol, hydroxyl number 56.4. One-third equivalent, or 15.3 g, of 2-hydroxyethyl acrylate was added to the reaction kettle at 30° C as a solution containing 1.2 g of di-o-tert.-butyl-p-cresol. When fully reacted the polymer was diluted with 108 g ethyl methacrylate, 108 g of ethyl acrylate, and a solution of 0.8 g di-o-tert.-butyl-p-cresol in 136 g of methyl acrylate. The remaining two-thirds of the isocyanate groups were reacted by the dropwise addition at 35°–40° C of 15.4 hexamethylene diamine as a solution in 100 g of ethyl methacrylate.

The syrup was completed by adding 5 g of benzoin methyl ether in 20 ml dimethylformamide and 20 g methacrylic acid. An 0.020 inch film was cured under ultraviolet radiation to give the following physical properties: tensile strength, 3200 psi; elongation at break, 380%; 100%, 200%, 300% molulii respectively, 450 psi, 800 psi, 1650 psi; fast tear ASTM D-412, 39 pli.

EXAMPLE 3

In a manner similar to that described in Example 1, 149 g of an isocyanate capped polyester polymer was prepared from poly(butylene isophthalate) diol, hydroxyl number 105.0. One-third equivalent of the isocyanate functionality was reacted with 2-hydroxyethyl acrylate diluted with 60 g methyl acrylate. The remaining isocyanate polymer was chain extended with a solution of 7.2 g of 1,6-hexamethylene diamine in 50 g of methyl methacrylate. The polymer syrup was completed by adding 9.8 g methacrylic acid and 1.5 g benzoin methyl ether in 5 ml dimethylformamide. The polymer syrup was cured as a film under ultraviolet light to give the following physical properties: tensile strength, 5000 psi; 100% modulus, 4000 psi; elongation at break, 180%; fast tear ASTM D-412, 140 pli.

EXAMPLE 4

In a manner similar to that described in Example 1 149 g of an isocyanate capped polyester polymer was prepared from poly(butylene isophthalate) diol, hydroxyl number 105.0. One-third equivalent, or 9.2 g, of 2-isocyanato ethyl methacrylate was added and reacted to form an intermediate product for subsequent polymer chain extension and capping with a diamine. The polymer was diluted with 35 g methyl acrylate, 12.5 g methyl methacrylate and 6.5 g ethyl methacrylate. The chain extending and capping reactions were performed by addition of a mixture prepared from 13.9 g 1,6-hexamethylene diamine, 35 g methyl acrylate, 12.5 g methyl methacrylate and 13 g ethyl methacrylate. The polymer syrup was completed by adding 10 g methacrylic acid and 1.5 g benzoin methyl ether in 5 ml dimethylformamide. A film cured by ultraviolet light exhibited the following elastomeric physical properties: tensile strength, 4400 psi; 100% modulus, 2500 psi; 200% modulus, 4200 psi; elongation at break, 210%; fast tear ASTM D-412, 165 pli.

EXAMPLE 5

The polymer prepared in Example 2 was combined with 0.2% by weight azobisisobutyronitrile. The polymer syrup was heated in a sealed mold at 70° C for 1 hour. The cured elastomer exhibited the appearance and properties of the photolytically polymerized material from Example 2.

EXAMPLE 6

In a manner similar to that described in Example 1 40 g of an isocyanate capped polyester polymer was prepared from poly(butylene isophthalate) diol and one-fifth of the terminal isocyanate functionality was reacted with 2-hydroxyethyl acrylate. The product was diluted with 10 g of methyl acrylate and 3.25 g methyl methacrylate. The polymer was chain extended through its isocyanato groups with a mixture prepared from 1.18 g ethylene diamine, 9.75 g methyl acrylate, and 3.25 g methyl methacrylate. The polymer syrup was completed by adding 0.39 g benzoin methyl ether initiator in 1 ml dimethyl formamide and cured as a film under ultraviolet light to give the following elastomeric film properties: tensile strength, 3,700 psi; 100% modulus, 2,500 psi; 200% modulus, 3,300 psi; elongation at break, 220%; fast tear ASTM D-412, 200 pli.

EXAMPLE 7

A resin kettle was charged with 146.2 g of a prepolymer prepared by reacting 1 mole of polytetramethylene ether glycol (MW 1000) with two moles of 4,4'-methylenebis(cyclohexyl isocyanate) containing 70% trans-trans isomer. Two-third equivalent, or 7.5 g, 2-hydroxyethyl acrylate was added as a solution containing 30 g methyl acrylate. The polymer was further diluted with 40 ml of dimethylformamide and fully chain extended with a diamine mixture prepared from 7.09 g 1,6-hexanediamine, 10 g methyl acrylate, and 16 g methyl methacrylate. The polymer syrup can be cured by free radical methods followed by removal of solvent to yield tough elastomeric films.

EXAMPLE 8

A resin kettle was charged with 185.4 g of 4,4'-dicyclohexyl methane diisocyanate and 0.22 g dibutyltindilaurate under a dry air atmosphere. At 40°-45° C a solution of 0.031 g phenothiazine in 27.1 g of 2-hydroxyethyl acrylate was added dropwise. When the above reaction was complete, 400 g of molten polycaprolactone diol, hydroxyl number 88.9, was added in small portions at 40°-50° C. The reaction was continued to a constant isocyanate percentage which was attained at 3.41%. The polymer possesses approximately one acrylate for every two isocyanate terminal residues.

To 100 g of the above prepolymer was added 43.4 g of methyl methacrylate and 0.001 g phenothiazine. In a separate vessel 4.5 g of 1,6-hexamethylene diamine was added to 18.6 g ethyl hexyl acrylate, 6.6 g methyl acrylate and 0.001 g phenothiazine and held at 30° C for 15 mins. The resulting solution of diamine-acrylate addition product was added dropwise to the polymer solution at 40°-45° C. The diamine chain extended polymer syrup was completed by adding 3.3 g of methacrylic acid and 1.7 g of benzoin methyl ether initiator.

The polymer syrup cures under ultraviolet irradiation to give a tough elastomeric film.

EXAMPLE 9

In a manner similar to that described in Example 8 a polymer was prepared from 185.4 g 4,4'-dicyclohexylmethane diisocyanate, 27.1 g 2-hydroxyethyl acrylate, and 400 g of polycaprolactone diol, hydroxyl number 88.9. 200 g of the polymer was diluted with 65 g methyl methacrylate and chain extended with a diamine-acrylate adduct solution prepared from 9.2 g 1,6-hexamethylene adduct diamine, 6.8 g methyl acrylate, and 65 g methyl methacrylate. The polymer syrup was completed by adding 7 g methacrylic acid and 1.9 g of benzoin methyl ether initiator. The polymer syrup cures under ultraviolet light to give a tough elastomeric film with the following physical properties: tensile strength, 5,200 psi; 100% modulus, 2,700 psi; 200% modulus, 5,000 psi; elongation at break, 220%; fast tear ASTM D-412, 118 pli. Similar properties were obtained by curing the polymer syrup with electron beam irradiation.

EXAMPLE 10

To a sample of the polymer syrup prepared in Example 9, 1% by weight cumene hydroperoxide, 2% methane sulfonyl chloride and 2% additional methacrylic acid were added. The polymer syrup was used to bond inhibitor-free, cured styrene-butadiene material to polyvinyl chloride coated fabric. The polymer syrup was cured at ambient room temperature using an aldehyde-amine accelerator prepared by condensation of butyraldehyde and aniline. Ultimate bond strengths of 54 pli were attained in unsupported 180° peel tests.

EXAMPLE 11

In a manner similar to that described in Example 8 a polymer was prepared from 99.3 g 2,4-toluene diisocyanate, 21.9 g 2-hydroxyethyl acrylate, and 300 g Hooker "Rucoflex" S1016-100 polyester diol, hydroxyl number 105.0. 200 g of the polymer was diluted with 89 g of methyl methacrylate and chain extended with a diamine-acrylate adduct solution prepared from 9.4 g 1,6-hexamethylene diamine, 38 g 2-ethylhexyl acrylate and 13.8 g methyl methacrylate. The polymer syrup was completed by adding 6.5 g methacrylic acid. The polymer syrup can be cured by free radical methods to give a soft, tough elastomer.

EXAMPLE 12

In a manner similar to that described in Example 8 a polymer was prepared from 70.4 g isophorone diisocyanate, 12.2 g of 2-hydroxyethyl acrylate, and 200 g polycaprolactone diol, hydroxyl number 88.9. The above polymer was diluted with 100 g of methyl methacrylate and fully chain extended with a diamine-acrylate adduct solution prepared from 10.2 g 1,6-hexamethylenediamine, 6.8 g methyl methacrylate, and 7.5 g methyl acrylate. The above polymer syrup may be cured by free radical methods to give elastomeric films with the following physical properties: tensile strength, 4500 psi; 100% modulus, 1950 psi; 200% modulus, 3050 psi; elongation at break, 270%; fast tear ASTM D-412, 100 pli.

EXAMPLE 13

In a manner similar to that described in Example 8 a polymer was prepared from 105.6 g 4,4'-dicyclohexyl methane diisocyanate, 15.4 g 2-hydroxyethyl acrylate, and 200 g of polypropylene glycol, hydroxyl number 112.7. The above polymer, 164 g, was diluted with 131 g N-vinyl-2-pyrrolidone and 100 g of methylene chloride and fully chain extended with a solution of 11.1 g piperazine in 60 g N-vinyl-2-pyrrolidone. The polymer syrup was completed by adding 12 g methacrylic acid. The polymer syrup may be cast allowing the methylene chloride to evaporate and cured by free radical methods to give the following film properties: 120% modulus, 3500 psi; fast tear ASTM D-412, 120 pli.

EXAMPLE 14

In a manner similar to that described in Example 9 a polymer syrup was prepared substituting one-half of the 2-hydroxyethyl acrylate with a molar equivalent of pentaerythritol triacrylate. The polymer syrup was cured as a film under ultraviolet irradiation to give the following film properties: tensile strength, 5200 psi;

100% modulus, 3100 psi; elongation at break, 180%; fast tear ASTM D-412, 104 pli.

EXAMPLE 15

In a manner similar to that described in previous examples, 140 g of the polymer prepared from polypropylene glycol in Example 13 was diluted with 44 g of methyl methacrylate and fully chain extended with a diamine-acrylate adduct solution prepared from 6.51 g 1,6-hexamethylene diamine, 4.82 g methyl acrylate, and 44 g of methyl methacrylate. Films cured by free radical methods exhibit the following properties: tensile strength, 3250 psi; 100% modulus, 1900 psi; 200% modulus, 3,000 spi; elongation at break, 210%; fast tear ASTM D-412, 80 pli.

EXAMPLE 16

In a manner similar to that described in Example 8 a polymer was prepared from 226 g 4,4'-dicyclohexyl methane diisocyanate, 34.6 g 2-hydroxyethyl acrylate, and 400 g polypropylene glycol, hydroxyl number 112.7. The above polymer was diluted with 147 g N-vinyl-2-pyrrolidone and chain extended with a diamine-acrylate adduct solution prepared from 30.4 g 1,6-hexamethylene diamine, 22.5 g of methyl acrylate, and 87 g of N-vinyl-2-pyrrolidone. The polymer syrup was completed by adding 47 g of hexamethylene diacrylate and 20 g of hydroxy ethyl methacrylate. The polymer syrup can be cured by free radical methods to give an elastomer with 3200 psi tensile strength and greater than 100% elongation at break.

EXAMPLE 17

The methyl methacrylate reactive diluent contained in a polymer syrup prepared according to the procedure in Example 9 was removed by evaporation. The resulting, essentially tack free elastomeric material, was dissolved in styrene to give a 40% styrene concentration based upon total weight. The polymer syrup was polymerized by free radical photoinitiation to give an elastomeric film similar to that prepared in Example 9.

EXAMPLE 18

To 79 g of a polymer syrup prepared according to Example 9 was added 14 g of a diacrylate prepared by reacting two moles of 2-hydroxyethyl acrylate with one mole of 4,4'-dicyclohexyl methane diisocyanate. A drawn film was cured under a nitrogen blanket using a medium pressure mercury arc ultraviolet lamp. The resultant tough elastomeric film exhibited the following physical properties: tensile strength, 5,700 psi; elongation at break, 113%; fast tear ASTM D-412, 81 pli.

EXAMPLE 19

To a 500 ml flask was charged 78.7 g (0.6 eq.) dicyclohexyl methane diisocyanate and 5 drops dibutyltin dilaurate catalyst. To this mixture at 50° C was added 11.6 g (0.1 eq.) 2-hydroxyethyl acrylate in several portions. After storing for 1 hour at 50° C 126.2 g (0.2 eq.) poly(1,6-hexylene isophthalate) glycol M.W. 1163 was added at 35° C. The exotherm was controlled by cooling to 55° C after which the reaction was stirred for 1 hr./50° C. The NCO content was 2.32% (theory = 2.64%).

To 50 g of this polymer dissolved in 34.1 g methyl methacrylate was added 1.20 g (96%) 1,3-butanediol. The mixture was stirred 1 hr./60° C. After cooling 0.5% benzoin isobutyl ether was added and films were drawn between polyester film and photocured to afford strong, elastomeric films with the following physical properties: tensile strength, 3,360 psi; 100% modulus, 2,630 psi; elongation at break, 200%; fast tear ASTM D-412, 114 pli.

EXAMPLE 20

To a 500 ml 3-necked flask was charged 52.2 g (0.6 eq.) of an 80/20 mixture of 2,4/2,6-toluene diisocyanate, 145.4 g poly(propylene ether) glycol m.w. 986 (0.3 eq.) and 11.6 g (0.1 eq.) 2-hydroxyethyl acrylate containing 0.13% phenothiazine. This mixture was stirred for 1 hr. at 60° C under dry air, cooled to 55° C and 10 drops of dibutyl tin dilaurate added. There was an 8°–10° heat kick after which stirring was continued at 55°–60° C for 1.75 hours. 1,4-Butanediol (8.6 g) was added (96% of theoretical value), followed by 25 g N-vinyl-pyrrolidone (NVP). The system exhibited another exotherm and was then stirred for 1 hr./60° C. The solution was pourable at 50° C.

To 30 g of this urethane/acrylate oligomer (90% in NVP) was added 3 additional grams of NVP and 6 grams of 2-ethylhexyl acrylate (EHA) [69% polymer in 1/1 NVP/EHA]. Drawn films of this syrup on cloth or poly(ethylene terephthalate) film afforded non-tacky, odor-free coatings with good bond after only 1 megarad dosages on a 2 mev electron beam under a nitrogen blanket. Unsupported films exhibited the following physical properties: tensile strength, 1,950 psi; 100% modulus, 780 psi; elongation at break, 200%; fast tear ASTM D-412, 25 pli.

I claim:

1. A coating composition consisting essentially of (A) 5 to 70 percent by weight of the coating composition of at least one ethylenically unsaturated monomer capable of being polymerized by free radical polymerization, said monomer being at least a partial solvent for (B), and (B) 30 to 90 percent by weight of the coating composition of a polymer having a molecular weight of 2,000 to 20,000 and the formula

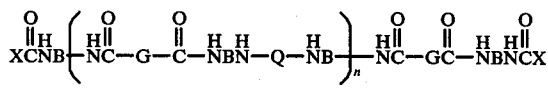

where G is a bivalent organic radical resulting from removal of terminal hydrogen groups from a diol, a diamine, or an aminoalcohol having a molecular weight of 300 to 3000, B is a bivalent organic radical having a molecular weight of about 80 to 400, Q is a bivalent organic radical having the formula

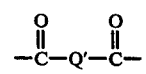

where Q' is formed by removing two active hydrogens from a primary or secondary diamine having a molecular weight between 60 and 300, X is a monovalent organic radical formed by removal of an active hydrogen from an alcohol or a monoamine having a molecular weight of not greater than about 300, and containing at least one polymerizable ethylenic linkage, and $n$ is the integer 1, 2, 3 or 4, said coating composition having a viscosity between about 1 and 3000 poises.

2. The composition of claim 1 in which Q' is the divalent radical resulting from the removal of two active hydrogens from hexamethylene diamine.

3. The composition of claim 1 in which the Q' radical is formed by reacting the amine groups contained in the adduct obtained from the reaction product of about equal molar portions of an aliphatic diprimary amine and an acrylate.

4. The composition of claim 3 in which the adduct is the reaction product of 1,6-hexamethylenediamine and methyl acrylate.

* * * * *